US011114679B2

(12) United States Patent
Soga et al.

(10) Patent No.: US 11,114,679 B2
(45) Date of Patent: Sep. 7, 2021

(54) CURABLE RESIN COMPOSITION, AND FUEL CELL AND SEALING METHOD USING THE SAME

(71) Applicant: THREEBOND CO., LTD., Hachioji (JP)

(72) Inventors: Tetsunori Soga, Hachioji (JP); Masayuki Fukumoto, Hachioji (JP)

(73) Assignee: THREEBOND CO., LTD., Hachioji (JP)

(*) Notice: Subject to any disclaimer, the term of this patent is extended or adjusted under 35 U.S.C. 154(b) by 244 days.

(21) Appl. No.: 16/497,252

(22) PCT Filed: Apr. 13, 2018

(86) PCT No.: PCT/JP2018/015517
§ 371 (c)(1),
(2) Date: Sep. 24, 2019

(87) PCT Pub. No.: WO2018/190417
PCT Pub. Date: Oct. 18, 2018

(65) Prior Publication Data
US 2020/0321634 A1 Oct. 8, 2020

(30) Foreign Application Priority Data
Apr. 14, 2017 (JP) .............................. JP2017-080229

(51) Int. Cl.
H01M 8/0284 (2016.01)
C08F 236/14 (2006.01)
(Continued)

(52) U.S. Cl.
CPC ......... H01M 8/0284 (2013.01); C08F 236/14 (2013.01); C09J 5/06 (2013.01);
(Continued)

(58) Field of Classification Search
CPC ............ H01M 8/0284; H01M 8/0273; H01M 8/1004; H01M 8/1018; H01M 2008/1095;
(Continued)

(56) References Cited

U.S. PATENT DOCUMENTS 6,703,433 B1    3/2004 Bahadur et al.
8,197,989 B2    6/2012 Jacobine et al.
(Continued)

FOREIGN PATENT DOCUMENTS

CN    101395749 A    3/2009
JP    2001-325972 A   11/2001
(Continued)

OTHER PUBLICATIONS

Europe Patent Office, "Search Report for European Patent Application No. 18784152.3," dated Dec. 4, 2020.
(Continued)

Primary Examiner — Stewart A Fraser
(74) Attorney, Agent, or Firm — Manabu Kanesaka

(57) ABSTRACT

The present invention aims to provide a curable resin composition which has low viscosity as well as properties such as high elongation property, high tensile strength, and hydrogen gas barrier property. A curable resin composition includes the following ingredients (A) to (D): ingredient (A): a vinyl polymer having one or more alkenyl groups in one molecule; ingredient (B): a compound having one or more hydrosilyl groups in one molecule; ingredient (C): a hydrosilylation catalyst; ingredient (D): a polyfunctional vinyl ether compound.

20 Claims, 1 Drawing Sheet

(51) Int. Cl.
*C09J 5/06* (2006.01)
*C09J 147/00* (2006.01)
*H01M 8/0273* (2016.01)
*H01M 8/1004* (2016.01)
*H01M 8/1018* (2016.01)

(52) U.S. Cl.
CPC ......... *C09J 147/00* (2013.01); *H01M 8/0273* (2013.01); *H01M 8/1004* (2013.01); *H01M 8/1018* (2013.01); *C08F 2800/20* (2013.01); *C09J 2301/416* (2020.08); *C09J 2409/00* (2013.01); *H01M 2008/1095* (2013.01); *H01M 2300/0082* (2013.01)

(58) Field of Classification Search
CPC .......... H01M 2300/0082; C08F 236/14; C08F 2800/20; C09J 5/06; C09J 147/00; C09J 2301/416; C09J 2409/00
See application file for complete search history.

(56) References Cited

U.S. PATENT DOCUMENTS

| | | |
|---|---|---|
| 2002/0028303 A1 | 3/2002 | Bahadur et al. |
| 2005/0043480 A1 | 2/2005 | Osawa |
| 2006/0052546 A1 | 3/2006 | Morikawa et al. |
| 2008/0289755 A1 | 11/2008 | Burdzy et al. |
| 2009/0000732 A1 | 1/2009 | Jacobine et al. |
| 2009/0004541 A1 | 1/2009 | Jacobine et al. |
| 2009/0004551 A1 | 1/2009 | Burdzy et al. |
| 2009/0162715 A1 | 6/2009 | Burdzy |
| 2009/0176953 A1 | 7/2009 | Morikawa et al. |
| 2009/0263669 A1 | 10/2009 | Burdzy et al. |
| 2018/0241056 A1 | 8/2018 | Soga et al. |
| 2019/0300690 A1* | 10/2019 | Soga ..................... C08L 101/02 |
| 2019/0315957 A1* | 10/2019 | Soga .................. H01M 8/0271 |
| 2020/0172770 A1* | 6/2020 | Soga ......................... C09J 5/06 |

FOREIGN PATENT DOCUMENTS

| | | |
|---|---|---|
| JP | 2003-533564 A | 11/2003 |
| JP | 2004-075824 A | 3/2004 |
| JP | 2004-111146 A | 4/2004 |
| JP | 2006-83299 A | 3/2006 |
| JP | 2007-100099 A | 4/2007 |
| JP | 2011-124258 A | 6/2011 |
| JP | 2014-225456 A | 12/2014 |
| WO | 2007/084561 A2 | 7/2007 |
| WO | 2008/016384 A2 | 2/2008 |
| WO | 2011/065154 A1 | 6/2011 |
| WO | 2017/029978 A1 | 2/2017 |

OTHER PUBLICATIONS

PCT/ISA/210, "International Search Report for International Application No. PCT/JP2018/015517," dated Jul. 10, 2018.
China Patent Office, "Office Action for Chinese Patent Application No. 201880024567.9," dated Apr. 19, 2021.

* cited by examiner

CURABLE RESIN COMPOSITION, AND FUEL CELL AND SEALING METHOD USING THE SAME

RELATED APPLICATIONS

The present application is National Phase of International Application No. PCT/JP2018/015517 filed Apr. 13, 2018, and claims priority from Japanese Application No. 2017-080229, filed Apr. 14, 2017, the disclosure of which is hereby incorporated by reference herein in its entirety.

TECHNICAL FIELD

The present invention relates to a curable resin composition having low viscosity as well as properties such as high elongation property, high tensile strength, and hydrogen gas barrier property.

BACKGROUND ART

In recent years, fuel cells have drawn attention as new energy systems for automobiles and households. A fuel cell is a power generator that extracts electricity by chemically reacting hydrogen and oxygen. In addition, the fuel cell is a clean power generator of the next generation because the fuel cell achieves a high energy efficiency in power generation, and generates only water from the reaction of the hydrogen and the oxygen. There are four types of fuel cells, i.e., a solid polymer fuel cell, a phosphoric acid fuel cell, a molten carbonate fuel cell, and a solid oxide fuel cell. Among them, the solid polymer fuel cell achieves a high power generation efficiency even though its operating temperature is relatively low temperature (around 80° C.), and therefore is expected for usages such as power sources for automobiles, power generators for households, small power sources for electronic equipment such as mobile phones, and power sources for emergency.

As illustrated in FIG. 1, a cell 1 of a solid polymer fuel cell has a structure including: an electrolyte membrane electrode assembly 5 (MEA) structured such that a polymer electrolyte membrane 4 is nipped between an air electrode 3a and a fuel electrode 3b; a frame 6 which supports the MEA; and separators 2 by which gas flow paths are formed.

In order to activate the solid polymer fuel cell, it is necessary to supply a fuel gas containing hydrogen to an anode electrode and supply an oxidation gas containing oxygen to a cathode electrode in such a separated manner that these gases can be isolated from each other. This is because there is a risk of lowering the power generation efficiency if one of the gases is mixed with the other gas due to insufficiency of the isolation. Against such a background, a sealing agent is used in many portions for the purpose of preventing leakage of the fuel gas, the oxygen gas, and so on. Specifically, the sealing agent is used between adjacent separators, between a separator and a frame, between a frame and an electrolyte membrane or MEA, and so on.

As to sealing agents for use in solid polymer fuel cells, studies have been made on: a thermosetting resin composition which uses a polyisobutylene-based polymer and causes a hydrosilylation reaction (see Patent Literature 1); a thermosetting resin composition which uses a fluoropolyether compound and causes a hydrosilylation reaction (see Patent Literature 2); a thermosetting resin composition which uses a fluoropolymer and causes a hydrosilylation reaction (see Patent Literature 3); and a thermosetting resin composition which uses an ethylene-propylene-diene rubber (see Patent Literature 4) as these compositions are rubber elastic bodies being excellent in hydrogen gas barrier properties, low moisture permeability, heat resistance, acid resistance, and flexibility.

CITATION LIST

Patent Literatures

Patent Literature 1: Japanese Patent Application Publication No. 2004-111146
Patent Literature 2: Japanese Patent Application Publication No. 2004-075824
Patent Literature 3: Japanese Patent Application Publication No. 2007-100099
Patent Literature 4: Japanese Patent Application Publication No. 2011-124258

SUMMARY OF INVENTION

The thermosetting resin compositions of Patent Literatures 1 to 4, however, use the polymers each having a large molecular weight in order to improve the sealing property, and therefore have a problem that the viscosity increases and the coating workability deteriorates. Also, it is common to use a method for adding a plasticizer to a curable resin composition to lower the viscosity thereof, but this method also causes a problem of lowering of the elongation property, the tensile strength, the hydrogen gas barrier property.

Under these circumstances, an object of the present invention is to provide a curable resin composition which has low viscosity as well as properties such as high elongation property, high tensile strength, and hydrogen gas barrier property.

Means for Solution of the Problems

The above problem is solved by the curable resin composition of the present invention.
[1] A curable resin composition comprising the following ingredients (A) to (D):
ingredient (A): a vinyl polymer having one or more alkenyl groups in one molecule
ingredient (B): a compound having one or more hydrosilyl groups in one molecule
ingredient (C): a hydrosilylation catalyst
ingredient (D): a polyfunctional vinyl ether compound.
[2] The curable resin composition according to [1], wherein the ingredient (D) is at least one selected from the group consisting of vinyl ether compounds containing a cycloalkane structure, vinyl ether compounds containing an ether structure, and vinyl ether compounds containing an alkylene structure.
[3] The curable resin composition according to [1] or [2], wherein the ingredient (A) is polyisobutylene having one or more alkenyl groups or an acrylic polymer having one or more alkenyl groups.
[4] A curable sealing agent for a fuel cell comprising the curable resin composition according to any one of [1] to [3].
[5] The sealing agent according to [4], wherein the curable sealing agent for a fuel cell is a curable sealing agent for a fuel cell for a periphery of any member selected from the group consisting of separators, frames, electrolytes, fuel electrodes, air electrodes, and electrolyte membrane electrode assemblies, which are members in a fuel cell.
[6] The sealing agent according to [4], wherein the curable sealing agent for a fuel cell is a sealing agent between adjacent separators in a fuel cell or a sealing agent between a frame of a fuel cell and an electrolyte membrane or an electrolyte membrane electrode assembly.

[7] The sealing agent according to any one of [4] to [6], wherein the fuel cell is a solid polymer fuel cell.

[8] A cured product obtained by photocuring the curable resin composition according to any one of [1] to [3] or the sealing agent according to any one of [4] to [6].

[9] A fuel cell comprising any seal selected from the group consisting of seals between adjacent separators in the fuel cell and seals between a frame and an electrolyte membrane or an electrolyte membrane electrode assembly in the fuel cell, wherein any one of the seals contains the cured product according to [8].

[10] The fuel cell according to [9], wherein the fuel cell is a solid polymer fuel cell.

[11] A method for sealing at least part of at least two flanges of seal target components including the at least two flanges, at least one of which is transmissive of heat or active energy rays, the method comprising the steps of: applying the curable resin composition according to any one of [1] to [3] to a surface of at least one of the flanges; sticking the one flange with the curable resin composition applied thereto onto the other flange with the curable resin composition interposed in between; and sealing the at least part of between the at least two flanges by curing the curable resin composition by heating or irradiation with active energy rays through the light-transmissive flange.

[12] A method for sealing at least part of at least two flanges of seal target components including the at least two flanges, the method comprising the steps of: applying the curable resin composition according to any one of [1] to [3] to at least one of the flanges; heating or irradiating the applied curable resin composition with active energy rays to cure the curable resin composition, thereby forming a gasket composed of a cured product of the curable resin composition; placing the other flange on the gasket, and sealing the at least part of between the at least two flanges in such a way that the other flange and the one flange with the curable resin composition applied thereto are pressure bonded together with the gasket interposed in between.

[13] A method for sealing at least part of at least two flanges of seal target components including the at least two flanges, the method comprising the steps of: placing a gasket formation mold on at least one of the flanges; injecting the curable resin composition according to any one of [1] to [3] into at least part of a cavity formed between the gasket formation mold and the flange on which the mold is placed; heating or irradiating the curable resin composition with active energy rays to cure the curable resin composition, thereby forming a gasket composed of a cured product of the curable resin composition; detaching the mold from the one flange; and sealing the at least part of between the at least two flanges by placing the other flange on the gasket and then pressure bonding the one and the other flanges together with the gasket interposed in between.

The present invention provides a curable resin composition having low viscosity as well as properties such as high elongation property, high tensile strength, and hydrogen gas barrier property.

DESCRIPTION OF EMBODIMENTS

Figure 1:
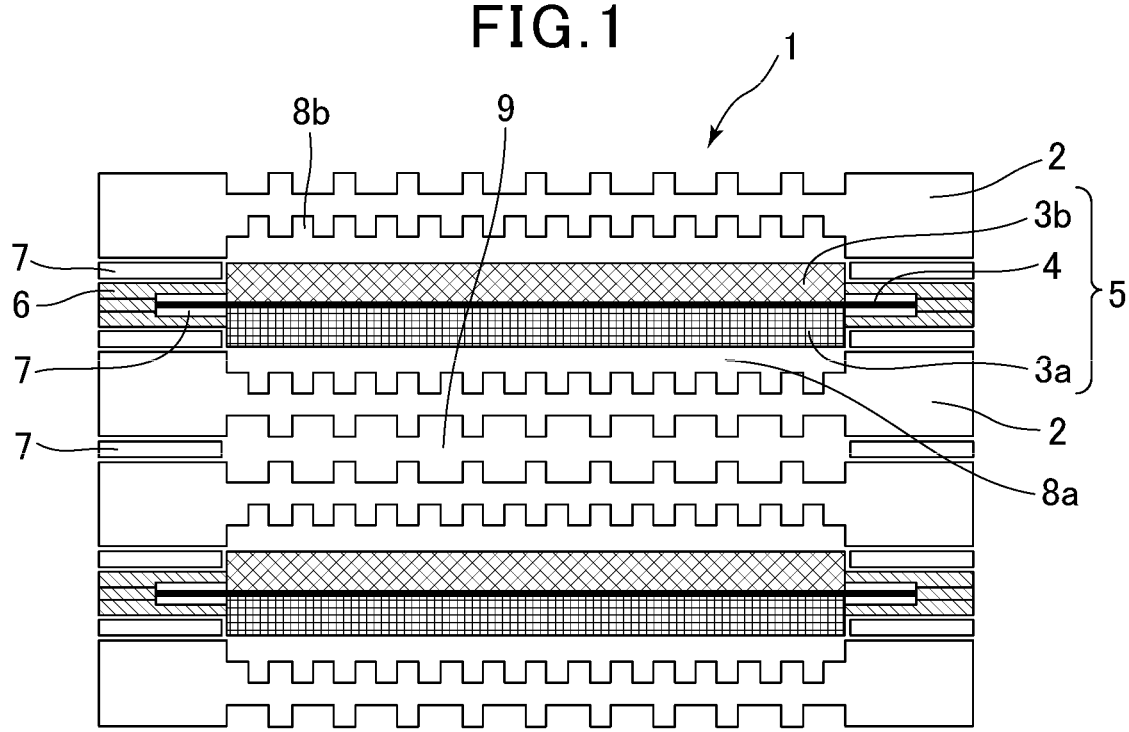
FIG. 1 is a schematic cross sectional view of a single cell of a fuel cell.

The details of the invention are described below.
<Curable Resin Composition>
The present invention relates to a curable resin composition comprising the following ingredients (A) to (D):
ingredient (A): a vinyl polymer having one or more alkenyl groups in one molecule
ingredient (B): a compound having one or more hydrosilyl groups in one molecule
ingredient (C): a hydrosilylation catalyst
ingredient (D): a polyfunctional vinyl ether compound.

It is possible to use the ingredients (A) to (D) as well as optional ingredients in the curable resin composition of the present invention by appropriately combining ingredients satisfying any of the conditions described below. Note that the ingredients (A) to (D) are mutually different ingredients.
<Ingredient (A)>

The ingredient (A) used in the present invention is not particularly limited as long as it is a vinyl-based polymer having one or more alkenyl groups in one molecule and in the liquid state at 25° C. (room temperature). The viscosity of the ingredient (A) of the present invention at 25° C. is, though not particularly limited, preferably 5 to 5000 Pa·s, more preferably 50 to 3000 Pa·s, and particularly preferably 100 to 2000 Pa·s from the viewpoint of workability and the like. Note that, unless otherwise noted, the measurement of the viscosity was carried out on the viscosity at 25° C. using a cone plate type viscometer. In addition, the case where an alkenyl group is at the end of the main chain of the vinyl-based polymer is preferable from the viewpoint that it is possible to obtain a rubber elastic body with low hardness as well as high strength and low compression set. Here, the alkenyl group is suitably an alkenyl group having, for example, 1 to 10 carbon atoms, preferably 2 to 8 carbon atoms, and more preferably 3 to 5 carbon atoms. As a preferable alkenyl group, for example, an allyl group, a propenyl group, a butenyl group, and the like are suitable. In addition, suitably the ingredient (A) preferably has 1 to 6, more preferably 2 to 4, further preferably 2 or 3, and particularly preferably 2 alkenyl groups (particularly at both ends of the polymer). In addition, the alkenyl group may be present at either the side chain or the end of the molecule, but is preferably present at the end of the molecule from the viewpoint of rubber elasticity.

The molecular weight of the ingredient (A) of the present invention is, though not particularly limited, preferably 500 to 500,000, further preferably 1,000 to 100,000, and particularly preferably 3,000 to 50,000 in terms of number average molecular weight from the viewpoint of e.g. fluidity and physical properties after curing. Note that, unless otherwise noted, number average molecular weight was calculated by a standard polystyrene conversion method using size exclusion chromatography (SEC).

Additionally, the vinyl polymer of the ingredient (A) includes, for example, polyisobutylene, polyisoprene, polybutadiene, (meth)acrylic polymers, and the like. Among them, polyisobutylene and acrylic polymers are preferable from the viewpoint of sealing property and polyisobutylene is particularly preferable from the viewpoint of excellence in gas barrier property.

The polyisobutylene of the ingredient (A) may have a —[CH$_2$C(CH$_3$)$_2$]— unit or may be polyisobutylene containing a "constituent unit other than the —[CH$_2$C(CH$_3$)$_2$]—6, unit." In addition, the —[CH$_2$C(CH$_3$)$_2$]— unit is contained in an amount of, for example, at least 50% by mass or more, preferably 70% by mass or more, more preferably 75% by mass or more, and further preferably 80% by mass or more relative to the total amount of the constituent units. In addition, the ingredient (A) suitably contains the —[CH$_2$C(CH$_3$)$_2$]— unit in an amount of, for example, 100% by mass or less, 95% by mass or less in another embodiment, and 90% by mass or less in still another embodiment. Note that, in the present invention, although the term poly or polymer is not limited by theory, it can be defined as, for example, a compound which has a structure with monomer repeating units in the main chain of the polymer and in which the number of the repeating units is, for example, 100 or more, preferably 300 or more, and more preferably 500 or more repeating units. For example, commercially available products of the polyisobutylene of the ingredient (A) include, but are not limited to, EPION (registered trademark) 200A, 400A, and 600A (manufactured by Kaneka Corporation), and the like.

The (meth)acrylic polymer of the ingredient (A) is, for example, propyl polyacrylate, butyl polyacrylate, pentyl polyacrylate, hexyl polyacrylate, and the like. For example, commercially available products of the (meth)acrylic polymer of the ingredient (A) include, but are not limited to, SA100A, OR100A, OR200A (manufactured by Kaneka Corporation), and the like.

<Ingredient (B)>

Hydrosilyl group-containing compounds of the ingredient (B) of the present invention are not particularly limited as long as they are cured by hydrosilylation reaction with the ingredient (A). The hydrosilyl group represents a group having a SiH bond. The ingredient (B) includes, but is not particularly limited to, preferably organohydrogen polysiloxanes, and more specifically silicones containing a hydrosilyl group in a molecule which is a linear, branched, cyclic, or reticular molecule. Additionally, a compound having, for example, two or more and preferably three or more hydrosilyl groups is preferable.

Commercially available products of the ingredient (B) include, but are not particularly limited to, CR-300 and CR-500 (manufactured by Kaneka Corporation), HMS-013, HMS-151, and HMS-301 (manufactured by Azmax Corporation), and SH 1107 Fluid (manufactured by Dow Corning Toray Co., Ltd.). The amount of the ingredient (B) blended is, though not particularly limited, preferably 0.1 to 50 parts by mass, more preferably 1 to 40 parts by mass, further preferably 5 to 30 parts by mass, and particularly preferably 8 to 20 parts by mass relative to 100 parts by mass of the ingredient (A). Within the range of 0.1 parts by mass to 50 parts by mass, it is possible to obtain a good hydrogen gas barrier property of the curable resin composition.

The amount (equivalent amount) of the ingredient (B) added is usually 0.5 to 2.5 equivalents and preferably 1.0 to 2.0 equivalents relative to 1 mol in total of the alkenyl groups contained in the ingredient (A) and the vinyl ether groups contained in the ingredient (D). The above range is preferable because, if the amount is 0.5 equivalents or more, the anti-gas permeability and the low moisture permeation of the cured product can be sufficiently ensured without the cross-linking density becoming low, and if the amount is 2.5 equivalents or less, the generation of hydrogen gas by the hydrosilylation reaction does not occur to cause a cured product foaming problem or to affect the heat resistance.

<Ingredient (C)>

As regards the hydrosilylation catalyst which is the ingredient (C) of the present invention, any catalyst can be used without particular limitation as long as it can catalyze the hydrosilylation reaction.

In the case of curing the present curable resin composition by heating, preferable catalysts being the ingredients (C) capable of curing by heating include: solid platinum supported on a support such as chloroplatinic acid, platinum simple substance, alumina, silica, and carbon black; complexes of chloroplatinic acid with alcohol, aldehyde, and ketone; platinum-olefin complexes such as Pt(CH$_2$=CH$_2$)$_2$Cl$_2$; platinum-vinylsiloxane complexes such as divinyltetramethyldisiloxane, Pt$_n$(ViMe$_2$SiOSiMe$_2$Vi)$_x$, and Pt[(MeViSiO)$_4$]$_y$; and platinum-phosphite complexes such as Pt(PPh$_3$)$_4$ and Pt(PBu$_3$)$_4$ (Vi means a vinyl group, and Me means a methyl group). Among these, chloroplatinic acid, the platinum-olefin complexes, and the platinum-vinylsiloxane complexes are preferable from the viewpoint of excellent activity. In addition, regarding the curing by the ingredient (C), it is more preferable to use a catalyst capable of curing by heating from a viewpoint of excellence in durability and reliability than to use a catalyst capable of curing the present curable resin composition to be described later by irradiation with active energy rays such as ultraviolet rays.

In addition, when curing the present curable resin composition by irradiation with active energy rays such as ultraviolet rays, preferable and usable catalysts being the ingredients (C) capable of curing by irradiation with active energy rays such as ultraviolet rays include, for example, a platinum complex having a β-diketonate compound as a ligand and a platinum complex having a cyclic diene compound as a ligand. Here, the active energy rays include all types of light in a broad sense such as radiation such as α-ray and β-ray, electromagnetic wave such as γ-ray and X-ray, electron beam (EB), ultraviolet ray of about 100 to 400 nm, visible light of about 400 to 800 nm, and ultraviolet ray is preferable.

The platinum complexes having a β-diketonate compound as a ligand include, for example, trimethyl (acetylacetonato) platinum, trimethyl (3,5-heptanedionate) platinum, trimethyl (methyl acetoacetate) platinum, bis(2,4-pentanedionato) platinum, bis(2,4-hexanedionato) platinum, bis (2,4-heptanedionato) platinum, bis(3,5-heptanedionato) platinum, bis(1-phenyl-1,3-butanedionato) platinum, and bis (1,3-diphenyl-1,3-propanedionato) platinum. Among them, bis(2,4-pentanedionato) platinum is particularly preferable from the viewpoint of high activity by ultraviolet rays.

The platinum complexes having a cyclic diene compound as a ligand include, for example, a (1,5-cyclooctadienyl) dimethyl platinum complex, a (1,5-cyclooctadienyl) diphenyl platinum complex, a (1,5-cyclooctadienyl) dipropyl platinum complex, a (2,5-norboradiene) dimethyl platinum complex, a (2,5-norboradiene) diphenyl platinum complex, a (cyclopentadienyl) dimethyl platinum complex, a (methylcyclopentadienyl) diethyl platinum complex, a (trimethylsilylcyclopentadienyl) diphenyl platinum complex, a (methylcycloocta-1,5-dienyl) diethyl platinum complex, a (cyclopentadienyl) trimethyl platinum complex, a (cyclopentadienyl) ethyl dimethyl platinum complex, a (cyclopentadienyl) acetyl dimethyl platinum complex, a (methylcyclopentadienyl) trimethyl platinum complex, a (methylcyclopentadienyl) trihexyl platinum complex, a (trimethylsilylcyclopentadienyl) trimethyl platinum complex, a (dimethylphenylsilylcyclopentadienyl) triphenyl platinum complex, and a (cyclopentadienyl) dimethyl trimethylsilylmethyl platinum complex. Preferable commercially available products of platinum complexes include an isopropyl alcohol solution of platinum divinyltetramethyldisiloxane complex (Pt-VTS-3.0 IPA, manufactured by Umicore Precious Metals Japan).

In addition, examples of catalysts other than platinum compounds include $RhCl(PPh_3)_3$, $RhCl_3$, $RuCl_3$, $IrCl_3$, $FeCl_3$, $AlCl_3$, $PdCl_3 \cdot 2H_2O$, $NiCl_2$, and $TiCl_4$. These catalysts may be used singly or in combination of two or more kinds.

The amount of the catalyst is not particularly limited, but it is advised to use in a range of $1 \times 10^{-1}$ to $1 \times 10^{-8}$ mol as a compound relative to 1 mol of the alkenyl groups in the ingredient (A). It is preferable to use in a range of $1 \times 10^{-2}$ to $1 \times 10^{-6}$ mol. In addition, the amount of the hydrosilylation catalyst is preferably less than $1 \times 10^{-1}$ mol because the hydrosilylation catalyst in such an amount is not too expensive, and does not generate a hydrogen gas to cause foaming in the cured product. Moreover, the absolute amount of the ingredient (C) in the curable resin composition is, for example, 10 to 1000 µl, preferably 50 to 700 µl, more preferably 100 to 500 µl, and further preferably 200 to 400 µl. The form of the ingredient (C) may be either solid or liquid, but it is suitable to use in the form of, for example, an alcohol solution, preferably in the form of a solution such as methanol, ethanol, or propanol, and more preferably in the form of an isopropanol solution.

<Ingredient (D)>

The ingredient (D) of the present invention, the polyfunctional vinyl ether compound, can be combined with other ingredients of the present invention to obtain significant effects that it is possible to obtain a cured product which can satisfy low viscosity as well as properties such as high elongation property, high tensile strength, and hydrogen gas barrier property. The polyfunctional vinyl ether compound means a compound having two or more vinyl ether groups. The ingredient (D) includes, but is not limited to, polyfunctional vinyl ether compounds containing a cycloalkane structure, polyfunctional vinyl ether compounds containing an ether structure, polyfunctional vinyl ether compounds containing an alkylene structure, and the like. The above effects are not exhibited when a monofunctional vinyl ether compound is used instead of the ingredient (D).

The polyfunctional vinyl ether compounds containing a cycloalkane structure are not particularly limited, and examples thereof include cyclohexane dimethanol divinyl ether and the like. In addition, the polyfunctional vinyl ether compounds containing an ether structure are not particularly limited, and examples thereof include triethylene glycol divinyl ether, diethylene glycol divinyl ether, tetraethylene glycol divinyl ether, and the like. In addition, the polyfunctional vinyl ether compounds containing an alkylene structure are not particularly limited, and examples thereof include 1,4-butanediol divinyl ether, 1,6-hexanediol divinyl ether, and the like.

Commercially available products of the ingredient (D) are not particularly limited, and include 1,4-butylene divinyl ether (BDVE), cyclohexane divinyl ether (CHDVE), diethylene glycol divinyl ether (DEGDVE), triethylene glycol divinyl ether (TEGDVE, manufactured by NIPPON CARBIDE INDUSTRIES CO., INC), and the like.

The amount of the ingredient (D) blended is, though not particularly limited, preferably 0.05 to 30 parts by mass, further preferably 0.1 to 20 parts by mass, and particularly preferably 0.5 to 10 parts by mass relative to 100 parts by mass of the ingredient (A). The amount is preferably 0.1 parts by mass or more because it is possible to obtain a cured product which has low viscosity and is excellent in high elongation property and high tensile strength. The amount is preferably 30 parts by mass or less because it is possible to obtain a cured product excellent in hydrogen gas barrier property.

<Optional Ingredients>

To the compositions of the present invention, it is possible to use various types of elastomers such as cross-linking agents, silane coupling agents, reaction rate regulators, and styrene-based copolymers, plasticizers such as fillers, storage stabilizers, antioxidants, light stabilizers, and polyalphaolefins, and additives such as pigments, flame retardants, and surfactants as long as the purpose of the present invention is not impaired.

Cross-linking agents may be added to the present invention. The cross-linking agents include, for example, 2,4,6-tris(allyloxy)-1,3,5-triazine, 1,2-polybutadiene, 1,2-polybutadiene derivatives, trimethylolpropane diallyl ether, pentaerythritol triallyl ether, pentaerythritol tetra(meth)acrylate, trimethylolpropane tri(meth)acrylate, trimethylolpropane di(meth)acrylate, triallyl phosphate ester, triallyl isocyanurate, diallyl isocyanurate, diallyl monoglycidyl isocyanurate, diallyl monobenzyl isocyanurate, diallyl monopropyl isocyanurate, diallyl phthalate, triallyl trimellitate, diethylene glycol bisallyl carbonate, trimethylolpropane diallyl ether, trimethylolpropane triallyl ether, pentaerythritol triallyl ether, pentaerythritol tetraallyl ether, 1,1,2,2-tetraallyloxyethane, diallylidene pentaerythrit, triallyl cyanurate, 1,2,4-trivinylcyclohexane, 1,4-butanediol diallyl ether, nonanediol diallyl ether, 1,4-cyclohexanedimethanol diallyl ether, triethylene glycol diallyl ether, diallyl ether of bisphenol S, divinylbenzene, divinylbiphenyl, 1,3-diisopropenylbenzene, 1,4-diisopropenylbenzene,1,3-bis(allyloxy) adamantane, 1,3-bis(vinyloxy)adamantane, 1,3,5-tris(allyloxy) adamantane, 1,3,5-tris(vinyloxy) adamantane, dicyclopentadiene, vinylcyclohexene, 1,5-hexadiene, 1,9-decadiene, diallyl ether, bisphenol A diallyl ether, 2,5-diallylphenol allyl ether, oligomers thereof, and allyl ether of novolac phenol.

Among them, 1,2,4-trivinylcyclohexane, triallyl isocyanurate, 2,4,6-tris(allyloxy)-1,3,5-triazine, 1,2-polybutadiene, and the like are preferable because of excellent miscibility with the ingredient (A) of the present invention.

The silane coupling agents include vinyl trimethoxysilane, vinyl triethoxysilane, 3-methacryloxypropylmethyldimethoxysilane, 3-methacryloxypropyltrimethoxysilane, 3-acryloxypropyltrimethoxysilane, 3-methacryloxypropylmethyldiethoxysilane, 3-methacryloxypropyltriethoxysilane, p-styryltrimethoxysilane, and allyltrimethoxysilane. In addition, commercially available products of the silane coupling agents include, but are not particularly limited to, KBM-1003, KBE-1003, KBM-502, KBE-502, KBM-503, KBE-503, KBM-5103, and KBM-1403 (manufactured by Shin-Etsu Chemical Co., Ltd.) and Z-6825 (manufactured by Dow Corning Toray Co., Ltd.).

Reaction rate regulators may be added to the present invention. The reaction rate regulators include, for example, alkyne compounds, maleic acid esters, organic phosphorus compounds, organic sulfur compounds, and nitrogen-containing compounds. These may be used singly or in combination of two or more kinds.

The alkyne compounds include, specifically, 3-hydroxy-3-methyl-1-butyne, 3-hydroxy-3-phenyl-1-butyne, 3,5-dimethyl-1-hexyne-3-ol, 1-ethynyl-1-cyclohexanol, and the like. In addition, the maleic acid esters and the like include maleic anhydride, dimethyl maleate, diethyl maleate, and the like. Here, the organic phosphorus compounds include, specifically, triorganophosphines, diorganophosphines, organophosphones, triorganophosphites, and the like. Here, the organic sulfur compounds include, specifically, organo-mercaptans, diorganosulfides, hydrogen sulfide, benzothiazole, thiazole, benzothiazole disulfide, and the like. Here, the nitrogen-containing compounds include, specifically, N,N,N',N'-tetramethylethylenediamine, N,N-dimethylethylenediamine, N,N-diethylethylenediamine, N,N-dibutylethylenediamine, N,N-dibutyl-1,3-propanediamine, N,N-dimethyl-1,3-propanediamine, N,N,N',N'-tetraethylethylenediamine, N,N-dibutyl-1,4-butanediamine, 2,2'-bipyridine, and the like. Suitably, the amount of the alkyne compound blended is about 0.01 to 10 parts by mass and preferably about 0.1 to 1 parts by mass relative to 100 parts by mass of the ingredient (A).

Various elastomers such as styrene-based copolymers may be added to the present invention. The various elastomers such as styrene-based copolymers include, for example, styrene-butadiene-styrene block copolymers and styrene-isoprene-styrene block copolymers as well as styrene-ethylene butylene-styrene block copolymers and styrene-ethylene propylene-styrene block copolymers obtained by hydrogenating them. These may be used singly or in combination of two or more kinds.

For the purpose of improving e.g. the elastic modulus and the fluidity of the cured product, fillers may be added to the present invention to an extent that does not impair the storage stability. The shape of the filler is not particularly limited, but a spherical shape is preferable because the mechanical strength of the cured product of the curable resin composition can be improved and an increase in viscosity can be suppressed. The average particle diameter of the filler is not particularly limited, but is preferably in a range of 0.001 to 100 μm and more preferably in a range of 0.01 to 50 μm. Specific examples of the filler include organic powders, inorganic powders, metallic powders, and the like. Fillers of inorganic powder include glass, silica, alumina, mica, ceramics, silicone rubber powders, calcium carbonate, aluminum nitride, carbon powders, kaolin clay, dried clay minerals, and dried diatomaceous earth, and the like. Suitably, the amount of inorganic powder blended is about 0.1 to 300 parts by mass, preferably 1 to 100 parts by mass, and more preferably about 10 to 50 parts by mass relative to 100 parts by mass of the ingredient (A). When the amount is more than 0.1 parts by mass, the effect will not be reduced. When the amount is 300 parts by mass or less, it is possible to obtain sufficient fluidity of the curable resin composition and to obtain good workability.

Silica can be blended for the purpose of adjusting the viscosity of the curable resin composition or improving the mechanical strength of the cured product.

Preferably, it is possible to use ones hydrophobically treated with organochlorosilanes, polyorganosiloxane, hexamethyldisilazane, or the like. Specific examples of silica can include particulate silica, spherical silica, fumed silica, and the like. Specific examples of the fumed silica include, for example, commercially available products manufactured by Nippon Aerosil Co., Ltd., such as trade name Aerosil R 974, R 972, R 972 V, R 972 CF, R 805, R 812, R 812 S, R 816, R 8200, RY 200, RX 200, RY 200 S, and R 202.

Fillers of organic powder include, for example, polyethylene, polypropylene, nylon, cross-linked acrylic, cross-linked polystyrene, polyesters, polyvinyl alcohols, polyvinyl butyral, and polycarbonate. The amount of organic powder blended is preferably about 0.1 to 100 parts by mass relative to 100 parts by mass of the ingredient (A). The above range is preferable because, if the amount is 0.1 parts by mass or more, sufficient effects can be obtained, and if the amount is 100 parts by mass or less, it is possible to sufficiently obtain fluidity of the curable resin composition and the workability is not reduced.

Storage stabilizers may be added to the present invention. The storage stabilizer includes, for example, 2-benzothiazolyl sulfide, benzothiazole, thiazole, dimethylacetylene dicarboxylate, diethylacetylene dicarboxylate, 2,6-di-t-butyl-4-methylphenol, butylhydroxyanisole, 2-(4-morpholinyldithio)benzothiazole, 3-methyl-1-buten-3-ol, acetylenic unsaturated group-containing organosiloxane, acetylene alcohol, 3-methyl-1-butyl-3-ol, diallyl fumarate, diallyl maleate, diethyl fumarate, diethyl maleate, dimethyl maleate, 2-pentene nitrile, 2,3-dichloropropene maleate, and the like. These may be used singly or in combination of two or more kinds.

Antioxidants may be added to the present invention. The antioxidant include, for example, quinone-based compounds such as β-naphthoquinone, 2-methoxy-1,4-naphthoquinone, methyl hydroquinone, hydroquinone, hydroquinone monomethyl ether, mono-tert-butyl hydroquinone, 2,5-di-tert-butyl hydroquinone, p-benzoquinone, 2,5-diphenyl-p-benzoquinone, and 2,5-di-tert-butyl-p-benzoquinone; phenols such as phenothiazine, 2,2-methylene-bis(4-methyl-6-tert-butylphenol), catechol, tert-butyl catechol, 2-butyl-4-hydroxyanisole, 2,6-di-tert-butyl-p-cresol, 2-tert-butyl-6-(3-tert-butyl-2-hydroxy-5-methylbenzyl)-4-methylphenyl acrylate, 2-[1-(2-hydroxy-3,5-di-tert-pentylphenyl) ethyl]-4,6-di-tert-pentylphenyl acrylate, 4,4'-butylidenebis(6-tert-butyl-3-methyl phenol), 4,4'-thiobis(6-tert-butyl-3-methyl phenol), 3,9-bis[2-[3-(3-tert-butyl-4-hydroxy-5-methylphenyl) propionyloxy]-1,1-dimethylethyl]-2,4,8,10-tetraoxaspiro[5,5]undecane, pentaerythritol tetrakis[3-(3,5-di-tert-butyl-4-hydroxyphenyl) propionate], thiodiethylene bis[3-(3,5-di-tert-butyl-4-hydroxyphenyl) propionate], octadecyl-3-(3,5-di-tert-butyl-4-hydroxyphenyl) propionate, N,N'-hexane-1,6-diylbis[3-(3,5-di-tert-butyl-4-hydroxyphenyl) propionamide], benzene propanoic acid, 3,5-bis(1,1-dimethylethyl)-4-hydroxy, $C_7$-$C_9$ side chain alkyl ester, 2,4-dimethyl-6-(1-methylpentadecyl) phenol, diethyl [[3,5-bis(1,1-dimethylethyl)-4-hydroxyphenyl] methyl] phosphonate, 3,3',3'',5,5',5''-hexa-tert-butyl-a,a',a''-(mesitylene-2,4,6-tolyl) tri-p-cresol, calcium diethyl bis[[3,5-bis(1,1-dimethylethyl)-4-hydroxyphenyl] methyl] phosphonate, 4,6-bis(octylthiomethyl)-o-cresol, ethylenebis(oxyethylene) bis[3-(5-tert-butyl-4-hydroxy-m-tolyl) propionate], hexamethylenebis[3-(3,5-di-tert-butyl-4-hydroxyphenyl) propionate, 1,3,5-tris(3,5-di-tert-butyl-4-hydroxybenzyl)-1,3,5-triazine-2,4,6 (1H,3H,5H)-trione, 1,3,5-tris[(4-tert-butyl-3-hydroxy-2,6-xylyl) methyl]-1,3,5-triazine-2,4,6 (1H,3H,5H)-trione, a reaction product of N-phenylbenzenamine and 2,4,6-trimethylpentene, 2,6-di-tert-butyl-4-(4,6-bis(octylthio)-1,3,5-triazine-2-ylamino) phenol, picric acid, and citric acid; phosphorus-based compounds such as tris(2,4-di-tert-butylphenyl)phosphite, tris[2-[[2,4,8,10-tetra-tert-butyldibenzo[d,f][1,3,2]dioxaphosphefin-6-yl]oxy]ethyl] amine, bis(2,4-di-tert-butylphenyl)pentaerythritol diphosphite, bis[2,4-bis(1,1-dimethylethyl)-6-methylphenyl]ethyl ester phosphorous acid, tetrakis(2,4-di-tert-butylphenyl)[1,1-bisphenyl]-4,4'-diyl bisphosphonite, 6-[3-(3-tert-butyl-4-hydroxy-5-methylphenyl)propoxy]-2,4,8,10-tetra-tert-butyl dibenz[d,f][1,3,2]dioxaphosphefin; amine-based compounds such as phenothiazine; lactone-based compounds; and vitamin E-based compounds. Among these, phenol-based compounds are preferable.

Light stabilizers may be added to the present invention. The light stabilizers include, for example, hindered amine types such as bis(2,2,6,6-tetramethyl-4-piperidyl)sebacate, bis(1,2,2,6,6-pentamethyl-4-piperidyl)sebacate, 4-benzoyloxy-2,2,6,6-tetramethylpiperidine, 1-[2-[3-(3,5-di-tert-butyl-4-hydroxyphenyl)propionyloxy]ethyl]-4-[3-(3,5-di-tert-butyl-4-hydroxyphenyl)propionyloxy]-2,2,6,6-tetramethylpiperidine, 1,2,2,6,6-pentamethyl-4-piperidinyl-methacrylate, bis(1,2,2,6,6-pentamethyl-4-piperidinyl)[[3,5-bis(1,1-dimethylethyl)-4-hydroxyphenyl]methyl]butyl malonate, decanedioic acid bis(2,2,6,6-tetramethyl-1(octyloxy)-4-piperidinyl)ester, a reaction product of 1,1-dimethylethyl hydroperoxide and octane, N,N',N'',N'''-tetrakis-(4,6-bis-(butyl-(N-methyl-2,2,6,6-tetramethylpiperidine-4-yl) amino)-triazine-2-yl)-4,7-diazadecane-1,10-diamine, a polycondensate of N-(2,2,6,6-tetramethyl-4-piperidyl) butylamine with dibutylamine-1,3,5-triazine-N,N'-bis(2,2,6,6-tetramethyl-4-piperidyl-1,6-hexamethylene diamine, poly[[6-(1,1,3,3-tetramethylbutyl)amino-1,3,5-triazine-2,4-diyl][(2,2,6,6-tetramethyl-4-piperidyl)imino]hexamethylene[(2,2,6,6-tetramethyl-4-piperidyl)imino]], a polymer of dimethyl succinate and 4-hydroxy-2,2,6,6-tetramethyl-1-piperidine ethanol, 2,2,4,4-tetramethyl-20-(β-lauryloxycarbonyl)ethyl-7-oxa-3,20-diazadispiro [5,1,11,2]heneicosan-21-one, β-alanine, N,-(2,2,6,6-tetramethyl-4-piperidinyl)-dodecyl ester/tetradecyl ester, N-acetyl-3-dodecyl-1-(2,2,6,6-tetramethyl-4-piperidinyl)pyrrolidine-2,5-dione, 2,2,4,4-tetramethyl-7-oxa-3,20-diazadispiro [5,1,11,2] heneicosan-21-one, 2,2,4,4-tetramethyl-21-oxa-3,20-diazacyclo-[5,1,11,2]-heneicosan-20-propanoic acid dodecyl ester/tetradecyl ester, propanedioic acid, [(4-methoxyphenyl)-methylene]-bis(1,2,2,6,6-pentamethyl-4-piperidinyl)ester, higher fatty acid esters of 2,2,6,6-tetramethyl-4-piperidinol, 1,3-benzenedicarboxamide, N,N'-bis(2,2,6,6-tetramethyl-4-piperidinyl); benzophenone-based compounds such as octabenzone; benzotriazole-based compounds such as 2-(2H-benzotriazole-2-yl)-4-(1,1,3,3-tetramethylbutyl)phenol, 2-(2-hydroxy-5-methylphenyl)benzotriazole, 2-[2-hydroxy-3-(3,4,5,6-tetrahydrophthalimide-methyl)-5-methylphenyl]benzotriazole, 2-(3-tert-butyl-2-hydroxy-5-methylphenyl)-5-chlorobenzotriazole, 2-(2-hydroxy-3,5-di-tert-pentylphenyl)benzotriazole, a reaction product of methyl 3-(3-(2H-benzotriazole-2-yl)-5-tert-butyl-4-hydroxyphenyl)propionate and polyethylene glycol, 2-(2H-benzotriazole-2-yl)-6-dodecyl-4-methyl phenol; benzoate-based compounds such as 2,4-di-tert-butylphenyl-3,5-di-tert-butyl-4-hydroxybenzoate; and triazine-based compounds such as 2-(4,6-diphenyl-1,3,5-triazine-2-yl)-5-[(hexyl)oxy]phenol. Hindered amine-based compounds are particularly preferable.

Plasticizers, pigments, flame retardants, and surfactants may be added to the present invention. The plasticizers include, for example, petroleum-based process oils such as paraffinic process oils, naphthenic process oils, and aromatic process oils, acrylic plasticizers, dibasic acid dialkyls such as diethyl phthalate, dioctyl phthalate, and dibutyl adipate, low molecular weight liquid polymers such as liquid polybutene and liquid polyisoprene, and the like. Preferable plasticizers include polyalphaolefin-based plasticizers and acrylic plasticizers. The amount of the plasticizer blended is, for example, 0.1 to 100 parts by mass, preferably 1 to 50 parts by mass, and more preferably 10 to 40 parts by mass relative to 100 parts by mass of the ingredient (A). The pigments include, for example, carbon and the like. The flame retardants include, for example, hydrated metal compound types, phosphorus types, silicone types, nitrogen compound types, and the like. The surfactants include, for example, anionic surfactants, nonionic surfactants, nonionic surfactants, and the like. These may be used singly or in combination of two or more kinds.

The curable resin composition of the present invention can be produced by a conventionally known method. It is possible to produce the curable resin composition by, for example, blending predetermined amounts of the ingredient (A) to the ingredient (D) as well as other optional ingredients, followed by mixing at a temperature of preferably 10 to 70° C., more preferably 20 to 50° C., and particularly preferably at room temperature (25° C.) for preferably 0.1 to 5 hours, more preferably 30 minutes to 3 hours, and particularly preferably around 60 minutes using a mixing means such as a mixer such as a planetary mixer.

<Application Method>

As a method for applying the curable resin composition of the present invention to an adherend, a publicly known method for a sealing agent or an adhesive is used. For example, it is possible to use methods such as dispensing using an automatic coater, spraying, inkjet, screen printing, gravure printing, dipping, and spin coating. The curable resin composition of the present invention is preferably liquid at 25° C. from the viewpoint of easiness in application.

<Cured Product>

The curable resin composition of the present invention can be cured to obtain a cured product by heating or by irradiation with active energy rays such as ultraviolet rays and visible light. In particular, a cured product obtained by heating is preferable because it is excellent in durability and reliability.

<Curing Method>

The temperature and time for heating may be any conditions that allow sufficient curing, and it is suitable to carry out heating under the condition of a temperature of, for example, 40 to 300° C., preferably 60 to 200° C., more preferably 80 to 150° C., and particularly preferably 130° C. and, for example, 10 seconds to 10 hours, preferably 1 minute to 5 hours, more preferably 30 minutes to 3 hours, and further preferably about 1 hour. From the viewpoint of low temperature curability, preferably, conditions of 80 to 150° C. for 30 minutes to 2 hours are appropriate. Consider the case of curing by irradiation with active energy rays including light such as ultraviolet rays and visible light. The light source includes, but is not particularly limited to, low pressure mercury lamp, a medium pressure mercury lamp, a high pressure mercury lamp, an extra high pressure mercury lamp, a black light lamp, a microwave excited mercury lamp, a metal halide lamp, a sodium lamp, a halogen lamp, a xenon lamp, an LED, a fluorescent lamp, sunlight, an electron beam irradiation device, and the like. As for an irradiation dose of light irradiation, a total dose is preferably 10 kJ/m$^2$ or more and more preferably 15 kJ/m$^2$ or more from the viewpoint of the properties of a cured product.

For example, when the curable resin composition of the present invention is a two-liquid type composition (kit), it is possible to cure at room temperature after mixing. In the case of use as a two-liquid type composition (kit), it is preferable that one liquid contain the ingredient (A) and the other liquid contain the ingredient (B). By separating the ingredient (A) and the ingredient (B) into separate liquids in this way, it is possible to suppress unnecessary reactions during storage and to enhance the storage stability. In use, curing is possible by mixing the two liquids or by bringing them into contact with each other after separate application.

<Usage and Sealing Agent>

Preferable use of the curable resin composition of the present invention or a cured product thereof is a thermosetting or photocurable sealing agent. In the present invention, the sealing agent includes usages such as an adhesive, a coating agent, an injecting agent, a potting agent, and the like. Note that for use in such usages, the curable resin composition of the present invention is preferably liquid at 25° C.

Since the curable resin composition of the present invention or a cured product thereof is a rubber elastic body being excellent in low gas permeability, low moisture permeability, heat resistance, acid resistance, and flexibility, specific usages of the sealing agents include stacked bodies for fuel cells, solar cells, dye-sensitized solar cells, lithium ion batteries, electrolytic capacitors, liquid crystal displays, organic EL displays, electronic paper, LEDs, hard disk devices, photodiodes, optical communication/circuits, electric wires/cables/optical fibers, optical isolators, IC cards, and the like; sensors; substrates; pharmaceutical and medical instruments and equipment; and the like. Among these usages, the usage as fuel cells is particularly preferable because the curable resin composition of the present invention is rapidly cured by irradiation with active energy rays such as ultraviolet rays, and is excellent in adhesion to an electrolyte membrane which is a poorly adhesive material.

<Fuel Cell>

The fuel cell is a power generator that extracts electric power by chemically reacting hydrogen with oxygen. Here, as for fuel cells, there are four types including a solid polymer fuel cell, a phosphoric acid fuel cell, a molten carbonate fuel cell, and a solid oxide fuel cell. Among them, the solid polymer fuel cell achieves high power generation efficiency while having a relatively low operating temperature (around 80° C.), and therefore is used for applications such as power sources for automobiles, power generators for households, small power source for electronic equipment such as a mobile phone, and power sources for emergency.

Figure 2:
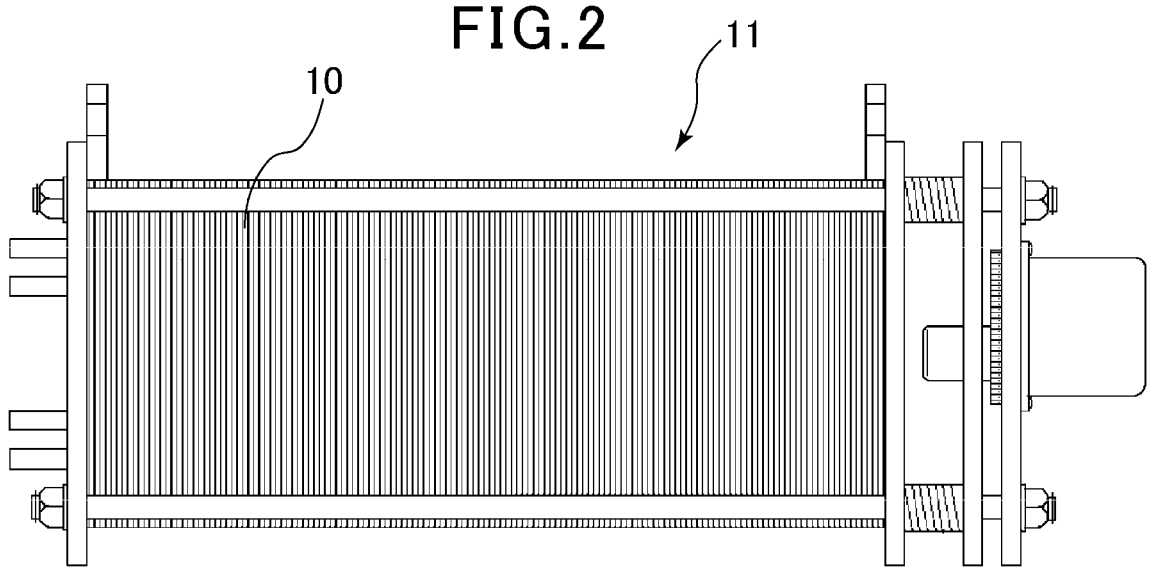
FIG. 2 is a schematic diagram illustrating the entire fuel cell.

As illustrated in FIG. 1, the cell 1 of the typical solid polymer fuel cell has the structure including: the electrolyte membrane electrode assembly 5 (MEA) structured such that the polymer electrolyte membrane 4 is nipped between the air electrode 3a and the fuel electrode 3b; the frame 6 supporting the MEA; and the separators 2 in which the gas flow paths are formed. In order to activate the solid polymer fuel cell, a fuel gas (hydrogen gas) and an oxidation gas (oxygen gas) are supplied through an oxidation gas flow path 8a and a fuel gas flow path 8b. Moreover, for the purpose of suppressing heat generation during power generation, cooling water flows through a flow path 9. Note that a package including several hundreds of such cells stacked on one another is referred to as a cell stack 10 as illustrated in FIG. 2.

When the fuel gas (hydrogen gas) is supplied to the fuel electrode and the oxidation gas (oxygen gas) is supplied to the oxygen electrode (air electrode), the following reactions occur at the respective electrodes, and a reaction to generate water ($H_2+1/2O \rightarrow H_2O$) occurs as a whole. To be more specific, protons (H+) generated at the fuel electrode as described below are diffused inside the solid polymer membrane to move to the oxygen electrode side, and water ($H_2O$) generated by reaction with the oxygen is discharged from the oxygen electrode side.

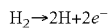   Fuel electrode (anode electrode)

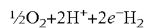   Oxygen electrode (cathode electrode)

In order to activate the solid polymer fuel cell, it is necessary to supply the anode electrode with the fuel gas containing hydrogen and supply the cathode electrode with the oxidation gas containing oxygen in such a separated manner that these gases can be isolated from each other. This is because there is a risk of lowering the power generation efficiency, if one of the gases is mixed with the other gas due to insufficiency of the isolation. Against such a background, a sealing agent is used in many portions for the purpose of preventing leakage of the fuel gas, the oxygen gas, and the like. Specifically, the sealing agent is used between adjacent separators, between a separator and a frame, between a frame and an electrolyte membrane or MEA, and so on.

As the polymer electrolyte membrane, there is a cation exchange membrane having ion conductivity, and a preferable one is made of a fluorine-based polymer having a sulfonic acid group or the like, because it is chemically stable and has high resistance under high-temperature operation. There are commercially available products such as Nafion (registered trademark) manufactured by DuPont, Flemion (registered trademark) manufactured by Asahi Kasei Corporation, Aciplex (registered trademark) manufactured by Asahi Glass Co., Ltd., and the like. Although a polymer electrolyte membrane generally has properties difficult to bond, use of the curable resin composition of the present invention makes it possible to bond the polymer electrolyte membrane.

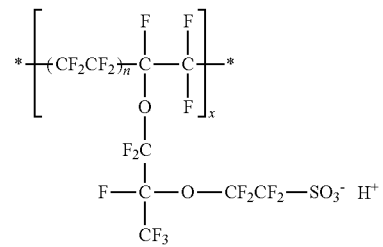

Nafion (registered trademark)

The fuel electrode is called a hydrogen electrode or an anode, and a known electrode is used as the fuel electrode. For example, an electrode in which carbon carries a catalyst such as platinum, nickel, or ruthenium is used. Meanwhile, the air electrode is called an oxygen electrode or a cathode, and a known electrode is used as the air electrode. For example, an electrode in which carbon carries a catalyst such as platinum or an alloy is used. The surface of each electrode may be provided with a gas diffusion layer which functions to diffuse the gas or to moisturize the electrolyte membrane. As the gas diffusion layer, a known layer is used, and examples thereof include carbon paper, carbon cloth, carbon fiber, and the like.

As illustrated in FIG. 1, each of the separators 2 is provided with finely-ribbed flow paths, through each of which a fuel gas or an oxidizing gas is supplied to the corresponding electrode. The separator is made of aluminum, stainless steel, titanium, graphite, carbon, or the like.

The frame supports and reinforces an electrolyte membrane or MEA, which is a thin membrane, so as not to break the electrolyte membrane or MEA. As a material for the frame, there are thermoplastic resins such as polyvinyl chloride, polyethylene naphthalate (PEN), polyethylene terephthalate (PET), polypropylene (PP), and polycarbonate. In addition, in order to bond members using the curable resin composition of the present invention or a cured product thereof, it is preferable that the members be transmissive of light such as active energy rays.

The fuel cell of the present invention is characterized in that sealing is provided by the curable resin composition of the present invention or a cured product thereof. The members needed to be sealed in the fuel cell are the separators, the frame, the electrolyte membrane, the fuel electrode, the air electrode, the MEA, and so on. More specifically, sealing is provided between the adjacent separators, between the separator and the frame, between the frame and the electrolyte membrane or MEA, and the like. Here, the main purpose of "sealing between the separator and the frame" or "between the polymer electrolyte membrane or the MEA and the frame" is to prevent mixing or leakage of the gases, and the sealing between the adjacent separators is provided in order to prevent leakage of the gas and to prevent leakage of the cooling water to the outside from the cooling water flow path.

<Sealing Method>

A sealing method using the curable resin composition of the present invention is not particularly limited, and typical methods are FIPG (Form-in-Place Gasket), CIPG (Cure-in-Place Gasket), MIPG (Mold-in-Place Gasket), liquid injection molding, and the like.

FIPG is a method involving: applying the curable resin composition of the present invention to a flange of a seal target component with an automatic coater or the like; and heating or irradiating the curable resin composition with active energy rays, with the flange stuck on another flange, and thus curing the curable resin composition to thereby carry out adhesive sealing. More specifically, this is a method for sealing at least part of at least two flanges of seal target components including the at least two flanges, at least one of which is heat-conductive or transmissive of active energy rays, the method comprising the steps of: applying the foregoing curable resin composition to a surface of at least one of the flanges; sticking the one flange with the curable resin composition applied thereto onto the other flange with the curable resin composition interposed in between; and sealing the at least part of between the at least two flanges by curing the curable resin composition by heating or irradiation with active energy rays through the flange transmissive of active energy rays.

CIPG is a method involving: applying the curable resin composition of the present invention in the form of a bead to a flange of a seal target component with an automatic coater or the like; heating or irradiating the curable resin composition with active energy rays and thus curing the curable resin composition to form a gasket; and performing compression sealing with the flange stuck on another flange. More specifically, this is a method for sealing at least part of at least two flanges of seal target components including the at least two flanges, the method comprising the steps of: applying the foregoing curable resin composition to at least one of the flanges; heating or irradiating the applied curable resin composition with active energy rays to cure the curable resin composition, thereby forming a gasket composed of a cured product of the curable resin composition; placing the other flange on the gasket, and sealing the at least part of between the at least two flanges in such a way that the other flange and the one flange with the curable resin composition applied thereto are pressure bonded together with the gasket interposed in between.

MIPG is a method involving: placing a mold in pressure contact with a flange of a seal target component in advance; injecting the curable resin composition into a cavity formed between the flange and the mold made of a light-transmissive material; heating or irradiating the curable resin composition with active energy rays to form a gasket; and performing compression sealing with the flange stuck on the other flange. In addition, for easy demolding of the gasket from the mold after the formation of the gasket, it is preferable to apply a release agent such as a fluorine-based agent or a silicone-based agent. More specifically, this is a method for sealing at least part of at least two flanges of seal target components including the at least two flanges, the method comprising the steps of: placing a gasket formation mold on at least one of the flanges; injecting the foregoing curable resin composition into at least part of a cavity formed between the gasket formation mold and the flange on which the mold is placed; heating or irradiating the curable resin composition with the active energy rays to cure the curable resin composition, thereby forming a gasket composed of a cured product of the curable resin composition; detaching the mold from the one flange; and sealing the at least part of between the at least two flanges by placing the other flange on the gasket and then pressure bonding the one and the other flanges together with the gasket interposed in between.

The liquid injection molding is a method involving: injecting the curable resin composition of the present invention with a predetermined pressure into a mold, followed by heating or irradiation with active energy rays to form a gasket; and performing compression sealing with the flange stuck on the other flange. In addition, for easy demolding of the gasket from the mold after the formation of the gasket, it is preferable to apply a release agent such as a fluorine-based agent, a silicone-based agent, or the like.

EXAMPLES

Hereinafter, the present invention will be described in further details by taking Examples, but the present invention should not be limited to these Examples.

<Preparation of Curable Resin Composition>

Each of the ingredients was sampled in an amount in parts by mass shown in Tables 1 and 2, and mixed for 60 minutes with a planetary mixer at room temperature (25° C.) to prepare a curable resin composition, and the various physical properties were measured as follows. Note that the detailed preparation amounts are indicated in Tables 1 and 2, and the numerical values are expressed in parts by mass. However, only the ingredient (C) is expressed in μl. Note that the amount of the ingredient (B) added amounts to a 1.6 equivalent ratio (hydrosilyl group/carbon-carbon double bonds). The carbon-carbon double bond means the total amount of the alkenyl groups contained in the ingredient (A) and the vinyl ether groups contained in the ingredient (D).

<Ingredient (A)> a1: polyisobutylene having an alkenyl group at both ends, 1700 Pa·s at 25° C. (EPION 400A, manufactured by Kaneka Corporation)

a2: acrylic polymer having an alkenyl group at both ends, 660 Pa·s at 25° C. (OR-100A, manufactured by Kaneka Corporation)

<Ingredient (B)> b1: hydrosilyl group-containing compound (CR-300, manufactured by Kaneka Corporation)

<Ingredient (C)> c1: isopropyl alcohol solution of platinum divinyltetramethyldisiloxane complex (Pt-VTS-3.0 IPA, manufactured by Umicore Precious Metals Japan)

<Ingredient (D)>
d1: cyclohexane divinyl ether (CHDVE, manufactured by NIPPON CARBIDE INDUSTRIES CO., INC)
d2: triethylene glycol divinyl ether (TEGDVE, manufactured by NIPPON CARBIDE INDUSTRIES CO., INC)
d3: diethylene glycol divinyl ether (DEGDVE, manufactured by NIPPON CARBIDE INDUSTRIES CO., INC)
d4: 1,4-butylene divinyl ether (BDVE, manufactured by NIPPON CARBIDE INDUSTRIES CO., INC)
<Comparative Ingredient for Ingredient (D)>
d'1: cyclohexane monovinyl ether (CHVE, manufactured by NIPPON CARBIDE INDUSTRIES CO., INC)
d'2: trivinylcyclohexane (reagent)
<Plasticizer>
plasticizer 1: polyalphaolefin-based plasticizer (SpectraSyn 10 manufactured by ExxonMobil)
plasticizer 2: acrylic plasticizer (UP-1000 manufactured by TOAGOSEI CO., LTD.)
<Other>
  dimethyl maleate (reagent)
  spherical silica (average particle diameter of 3 μm)

The test methods carried out in the Examples and Comparative Examples of Table 1 are as follows.
<Viscosity Measurement Method>

The viscosity (Pa·s) of the curable resin composition was measured with a cone plate type viscometer (manufactured by Brookfield) under the following measurement conditions. Evaluation was carried out based on the following criteria, and the results are shown in Table 1. The viscosity is preferably 800 Pa·s or less and particularly preferably 700 Pa·s or less.
[Measurement Conditions]

Cone type CPE-52, rotational speed 0.5 rpm, shear rate 1.0 l/s, temperature 25° C.
<Measurement of Hardness>

The thickness of the curable resin composition was set to 2 mm, followed by heat curing by heating at 130° C. for 1 hour to prepare a sheet-shaped cured product. While keeping the pressing surface of the A-type durometer (hardness tester) parallel to the test pieces (three sheet-shaped cured products were stacked to a thickness of 6 mm), the sample was pressed with a force of 10 N into contact with the pressing surface. At the time of measurement, the maximum value was read, and the maximum value was referred to as the "hardness" (Shore A hardness). The details were in accordance with JIS K 6253 (2012). Note that the hardness (Shore A hardness) is preferably 30 or more and more preferably 35 or more.
<Measurement of Tensile Strength>

The thickness of the curable resin composition was set to 2 mm, followed by heat curing by heating at 130° C. for 1 hour to prepare a sheet-shaped cured product. A No. 3 dumbbell was used for punchout to make a test piece. Both ends of the test piece were fixed to the chucks so that the long axis of the test piece and the centers of the chucks were aligned in a straight line. The test piece was pulled at a pulling rate of 50 mm/min, and the maximum load was measured. The strength at the time of the maximum load was referred to as the "tensile strength (MlPa)." The details were in accordance with JIS K 6251 (2010). Note that the tensile strength is preferably 2.0 MPa or more and more preferably 2.5 MPa or more.
<Method for Measuring Elongation Rate of Cured Product>

The thickness of the curable resin composition was set to 2 mm, followed by heating at 130° C. for 1 hour for heat-curing to prepare a sheet-shaped cured product. Punchout was done with a No. 3 dumbbell to prepare a test piece, followed by drawing of mark lines in the test piece with a spacing of 20 mm.

The test piece was fixed to the chuck in the same manner as the measurement of the tensile strength and was pulled at a pulling rate of 500 mm/min until the test piece was cut. Since the test piece extended while being measured and the distance between the mark lines was widened, measurement was carried out on the interval between the marks with a caliper until the test piece was cut. Based on the initial mark line interval, the rate of elongation was defined as "elongation rate (%)." Evaluation was carried out based on the following criteria, and the results are shown in Table 1. Note that the elongation rate is preferably 200% or more and more preferably 230% or more.

TABLE 1

| Ingredient | Example 1 | Example 2 | Example 3 | Example 4 | Comparative Example 1 | Comparative Example 2 | Comparative Example 3 |
|---|---|---|---|---|---|---|---|
| a1 | 100 | 100 | 100 | 100 | 100 | 100 | 100 |
| b1 | 12.3 (1.6 Equivalents) | 12.2 (1.6 Equivalents) | 13.3 (1.6 Equivalents) | 13.9 (1.6 Equivalents) | 8.1 (1.6 Equivalents) | 11.3 (1.6 Equivalents) | 15.7 (1.6 Equivalents) |
| c1 | 300 μl | 300 μl | 300 μl | 300 μl | 300 μl | 300 μl | 300 μl |
| d1 | 1 | | | | | | |
| d2 | | 1 | | | | | |
| d3 | | | 1 | | | | |
| d4 | | | | 1 | | | |
| d'1 | | | | | | 1 | |
| d'2 | | | | | | | 1 |
| Plasticizer 1 | 30 | 30 | 30 | 30 | 30 | 30 | 30 |
| Dimethyl Maleate | 0.2 | 0.2 | 0.2 | 0.2 | 0.2 | 0.2 | 0.2 |
| Spherical Silica | 25 | 25 | 25 | 25 | 25 | 25 | 25 |
| Viscosity Pa · s | 636 | 633 | 582 | 560 | 950 | 622 | 588 |
| Hardness A | 40 | 35 | 35 | 38 | 28 | 25 | 29 |
| Tensile Strength MPa | 3.4 | 2.6 | 2.7 | 2.6 | 1.7 | 1.6 | 1.8 |
| Elongation Rate % | 243 | 330 | 324 | 270 | 280 | 410 | 299 |

Examples 1 to 4 of Table 1 showed that the present invention had low viscosity as well as properties such as high elongation property and high tensile strength.

On the other hand, Comparative Example 1, from which the ingredient (D) of the present invention had been removed, produced results that it was high in viscosity and also inferior in tensile strength. Comparative Examples 2 and 3, which used d'1 and d'2 different from the ingredient (D) of the present invention, produced results that they were soft in hardness and also inferior in tensile strength.

<Test for Hydrogen Gas Barrier Property>

The thickness of the curable resin composition of Example 1 was set to 2 mm, followed by heating at 130° C. for 1 hour for heat-curing to prepare a sheet-shaped cured product. The cured product was used for measurement in accordance with JIS K 7126-1: 2006 (plastic-film and sheet-gas permeability test method—Part 1: differential pressure method). Note that the type of the test was a pressure sensor method under the condition of 23° C. Measurement was performed using a sheet of 1 mm thick with the test gas (hydrogen gas) on the high pressure side under 100 kPa. Evaluation was carried out based on the following evaluation criteria. The resulting value was less than $1 \times 10^{-14}$ mol·m/m$^2$·s·Pa, from which it was revealed that usage as a sealing agent for a fuel cell was possible.

Next, verification was conducted on a curable composition in which the ingredient (A) was changed from a1 (polyisobutylene having an alkenyl group at both ends) to a2 (acrylic polymer having an alkenyl group at both ends) (see Table 2).

Preparation of Example 5

Moreover, Example 5 was prepared in the same manner as Example 1 except that, in Example 1, the ingredient (A) was changed from a1 to a2 and the plasticizer 1 was changed to the plasticizer 2 (see Table 2).

Preparation of Comparative Example 4

Comparative Example 4 was prepared in the same manner as Comparative Example 1 except that, in Comparative Example 1, the ingredient (A) was changed from a1 to a2 and the plasticizer 1 was changed to the plasticizer 2 (see Table 2).

The test methods carried out in Example 5 and Comparative Example 4 in Table 2 were the same as the test methods carried out in Examples 1 to 4 and the like. Note that the hardness (Shore A hardness) is preferably 10 or more and more preferably 12 or more, and the tensile strength is preferably 1.0 MPa or more and more preferably 1.2 MPa or more.

TABLE 2

| Ingredient | Example 5 | Comparative Example 4 |
|---|---|---|
| a2 | 100 | 100 |
| b1 | 8.6 (1.6 Equivalents) | 4.4 (1.6 Equivalents) |
| c1 | 300 µl | 300 µl |
| d1 | 1 | |
| Plasticizer 2 | 30 | 30 |
| Dimethyl Maleate | 0.2 | 0.2 |
| Spherical Silica | 25 | 25 |
| Viscosity Pa · s | 585 | 870 |
| Hardness A | 12 | 8 |
| Tensile Strength MPa | 1.2 | 0.5 |
| Elongation Rate % | 348 | 220 |

Example 5 of Table 2 showed that, as in the case of Examples 1 to 4, the case of changing the ingredient (A) from a1 to a2 also provided low viscosity as well as properties such as high elongation property and high tensile strength.

On the other hand, Comparative Example 4, from which the ingredient (D) of the present invention had been removed, produced results that it was high in viscosity and also inferior in tensile strength.

INDUSTRIAL APPLICABILITY

The curable resin composition of the present invention has low viscosity as well as properties such as high elongation property, high tensile strength, and hydrogen gas barrier property, and thus can be applied to various usages such as a sealing agent, an adhesive, a coating agent, an injecting agent, a potting agent, and the like. Therefore, the curable resin composition of the present invention is industrially useful.

REFERENCE SIGNS LIST

1 cell of solid polymer fuel cells
2 separator
3*a* air electrode (cathode)
3*b* fuel electrode (anode)
4 polymer electrolyte membrane
5 electrolyte membrane electrode assembly (MEA)
6 frame
7 adhesive or sealing agent
8*a* oxidation gas flow path
8*b* fuel gas flow path
9 cooling water flow path
10 cell stack
11 solid polymer fuel cell

What is claimed is:

1. A curable resin composition comprising the following ingredients (A) to (D):
   ingredient (A): a vinyl polymer having one or more alkenyl groups in one molecule
   ingredient (B): a compound having one or more hydrosilyl groups in one molecule
   ingredient (C): a hydrosilylation catalyst
   ingredient (D): a polyfunctional vinyl ether compound.

2. The curable resin composition according to claim 1, wherein
   the ingredient (D) is at least one selected from the group consisting of polyfunctional vinyl ether compounds containing a cycloalkane structure, polyfunctional vinyl ether compounds containing an ether structure, and polyfunctional vinyl ether compounds containing an alkylene structure.

3. The curable resin composition according to claim 1, wherein
   the ingredient (A) is polyisobutylene having one or more alkenyl groups or an acrylic polymer having one or more alkenyl groups.

4. A curable sealing agent for a fuel cell comprising the curable resin composition according to claim 1.

5. The curable sealing agent for a fuel cell according to claim 4, wherein the curable sealing agent for a fuel cell is a curable sealing agent for a fuel cell for a periphery of any member selected from the group consisting of separators, frames, electrolytes, fuel electrodes, air electrodes, and electrolyte membrane electrode assemblies, which are members in a fuel cell.

6. The curable sealing agent for a fuel cell according to claim 4, wherein the curable sealing agent for a fuel cell is a sealing agent between adjacent separators in a fuel cell or a sealing agent between a frame of a fuel cell and an electrolyte membrane or an electrolyte membrane electrode assembly.

7. The curable sealing agent for a fuel cell according to claim 4, wherein the fuel cell is a solid polymer fuel cell.

8. A cured product obtained by curing the curable sealing agent for a fuel cell according to claim 4.

9. A cured product obtained by curing the curable resin composition according to claim 1.

10. A fuel cell comprising any seal selected from the group consisting of seals between adjacent separators in the fuel cell and seals between a frame and an electrolyte membrane or an electrolyte membrane electrode assembly in the fuel cell, wherein
any one of the seals contains the cured product according to claim 9.

11. The fuel cell according to claim 10, wherein the fuel cell is a solid polymer fuel cell.

12. A method for sealing at least part of at least two flanges of seal target components including the at least two flanges, at least one of which is transmissive of heat or active energy rays, the method comprising the steps of:
applying the curable resin composition according to claim 1 to a surface of at least one of the flanges;
sticking the one flange with the curable resin composition applied thereto onto the other flange with the curable resin composition interposed in between; and
sealing the at least part of between the at least two flanges by curing the curable resin composition by heating or irradiation with active energy rays through the light-transmissive flange.

13. A method for sealing at least part of at least two flanges of seal target components including the at least two flanges, the method comprising the steps of:
applying the curable resin composition according to claim 1 to at least one of the flanges;
heating or irradiating the applied curable resin composition with active energy rays to cure the curable resin composition, thereby forming a gasket composed of a cured product of the curable resin composition;
placing the other flange on the gasket, and sealing the at least part of between the at least two flanges in such a way that the other flange and the one flange with the curable resin composition applied thereto are pressure bonded together with the gasket interposed in between.

14. A method for sealing at least part of at least two flanges of seal target components including the at least two flanges, the method comprising the steps of:
placing a gasket formation mold on at least one of the flanges;
injecting the curable resin composition according to claim 1 into at least part of a cavity formed between the gasket formation mold and the flange on which the mold is placed;
heating or irradiating the curable resin composition with active energy rays to cure the curable resin composition, thereby forming a gasket composed of a cured product of the curable resin composition;
detaching the mold from the one flange; and
sealing the at least part of between the at least two flanges by placing the other flange on the gasket and then pressure bonding the one and the other flanges together with the gasket interposed in between.

15. The curable resin composition according to claim 1, wherein
the ingredient (A) is a polyisobutylene having a —[CH$_2$C(CH$_3$)$_2$]- unit.

16. The curable resin composition according to claim 1, wherein
the ingredient (B) is a silicone containing a hydrosilyl group in a molecule which is a linear, branched, cyclic, or reticular molecule.

17. The curable resin composition according to claim 1, wherein
the ingredient (C) is at least one selected from the group consisting of chloroplatinic acid, the platinum-olefin complexes, and the platinum-vinylsiloxane complexes.

18. The curable resin composition according to claim 1, wherein
the ingredient (D) is at least one selected from the group consisting of cyclohexane divinyl ether, triethylene glycol divinyl ether, diethylene glycol divinyl ether, and 1,4-butylene divinyl ether.

19. The curable resin composition according to claim 1 further comprising a plasticizer.

20. The curable resin composition according to claim 19, wherein the plasticizer is a polyalphaolefin-based plasticizer.

* * * * *